(12) United States Patent
Park

(10) Patent No.: US 12,449,054 B2
(45) Date of Patent: Oct. 21, 2025

(54) PUMPHEAD WITH TRIGGER HANDLE

(71) Applicant: BELL SPORTS, INC., Scotts Valley, CA (US)

(72) Inventor: Stephen Park, Diamond Bar, CA (US)

(73) Assignee: Bell Sports, Inc., Scotts Valley, CA (US)

( * ) Notice: Subject to any disclaimer, the term of this patent is extended or adjusted under 35 U.S.C. 154(b) by 8 days.

(21) Appl. No.: 18/417,022

(22) Filed: Jan. 19, 2024

(65) Prior Publication Data
US 2024/0247728 A1 Jul. 25, 2024

Related U.S. Application Data

(60) Provisional application No. 63/439,893, filed on Jan. 19, 2023.

(51) Int. Cl.
*F16K 24/06* (2006.01)
*B60S 5/04* (2006.01)

(52) U.S. Cl.
CPC ............... *F16K 24/06* (2013.01); *B60S 5/04* (2013.01)

(58) Field of Classification Search
CPC ............. F04B 33/005; Y10T 137/3724; Y10T 137/3584
See application file for complete search history.

(56) References Cited

U.S. PATENT DOCUMENTS

| | | | |
|---|---|---|---|
| 5,513,508 A * | 5/1996 | Saunders | F04B 33/005 70/30 |
| 5,819,781 A | 10/1998 | Wu | |
| 6,076,544 A | 6/2000 | Pierce | |
| 9,206,916 B1 | 12/2015 | Wang | |
| 9,309,980 B2 | 4/2016 | Ward et al. | |
| D777,229 S | 1/2017 | Scott | |
| 9,649,898 B2 | 5/2017 | Scott | |
| 10,369,851 B2 | 8/2019 | Wu | |
| 10,760,708 B1 | 9/2020 | Ashmead | |
| 11,235,738 B2 | 2/2022 | Park | |
| 11,850,898 B1 | 12/2023 | Tages | |
| 12,013,054 B1 | 6/2024 | Tages | |
| 12,092,237 B1 | 9/2024 | Tages | |

(Continued)

FOREIGN PATENT DOCUMENTS

| DE | 102021200032 B3 | 4/2022 |
|---|---|---|
| TW | M251030 U | 11/2004 |

OTHER PUBLICATIONS

International Search Report and Written Opinion in related application No. PCT/US2024/012104, mailed Aug. 6, 2024; 15 pgs.

*Primary Examiner* — P. Macade Nichols
(74) *Attorney, Agent, or Firm* — Reed Smith LLP; Walter M. Egbert, III; Richard J. Brown

(57) ABSTRACT

A pumphead comprises a housing having a first end defining an aperture configured to receive a valve head therein; a handle housing defining an air passage in fluid connection with the aperture and an air pump; and a lock arm comprising an end pivotally coupled to the pumphead housing at the end of the pumphead housing opposite the aperture; and a second end disposed between the handle housing and the first end of the pumphead housing. Pivoting the lock arm toward the handle housing locks the pumphead housing around the valve head when the valve head is received in the aperture.

22 Claims, 15 Drawing Sheets

(56) References Cited

U.S. PATENT DOCUMENTS

| | | | |
|---|---|---|---|
| 2014/0190576 A1* | 7/2014 | Wang | F16K 15/20 137/231 |
| 2015/0252910 A1 | 9/2015 | Ward et al. | |
| 2015/0316159 A1* | 11/2015 | Wang | F16K 15/20 137/231 |
| 2019/0107225 A1 | 4/2019 | Ward et al. | |

* cited by examiner

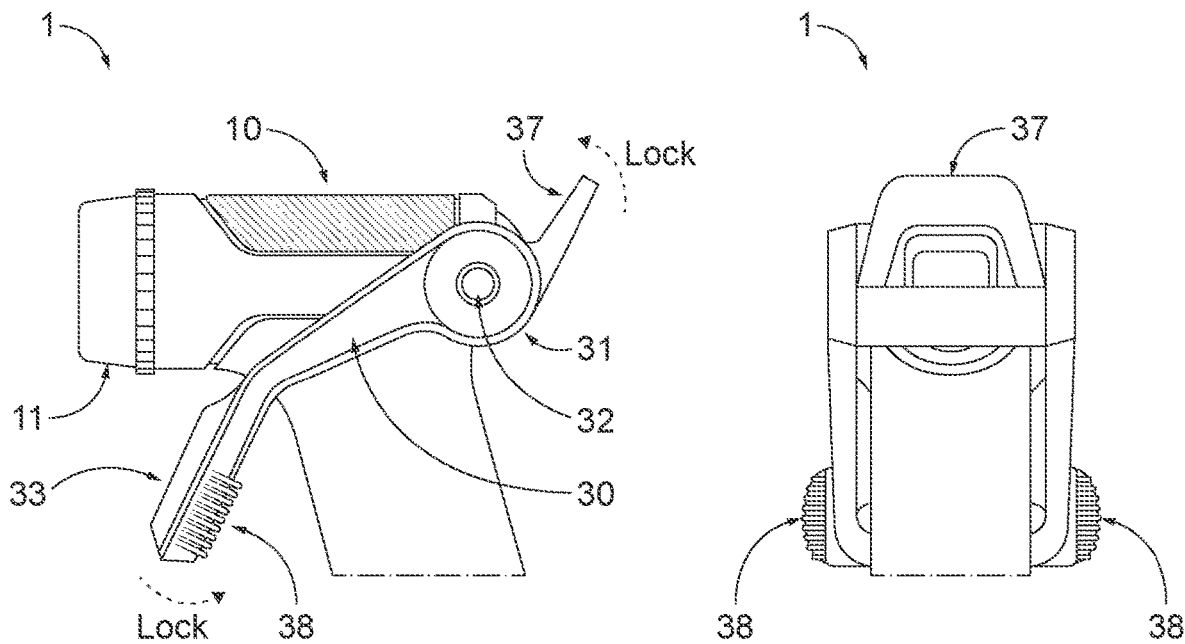
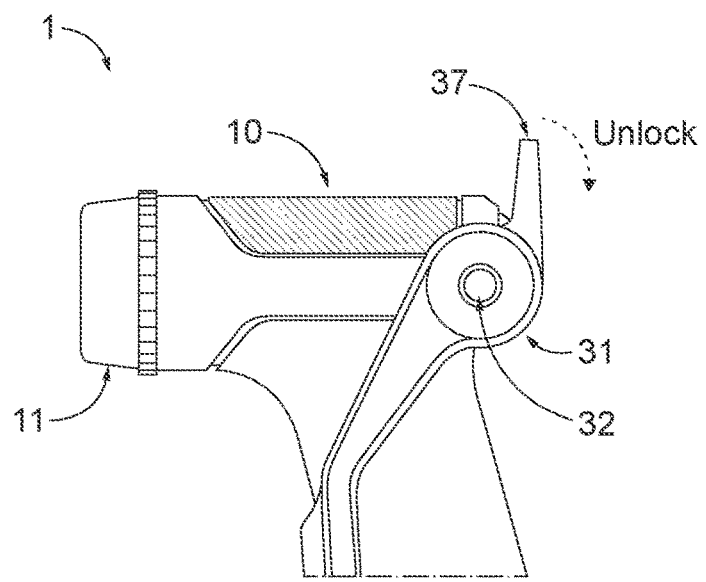

PUMPHEAD WITH TRIGGER HANDLE

CROSS REFERENCE TO RELATED APPLICATIONS

This application claims the benefit of U.S. Provisional Patent Application No. 63/439,893, filed Jan. 19, 2023, the contents of which are incorporated herein by reference in its entirety.

TECHNICAL FIELD

Aspects of the present disclosure generally relate to pumpheads, more particularly to a multi-valve pumphead for use with multiple air valve configurations.

BACKGROUND

Air chambers, such as those found in bicycle tires and other inflatable devices, use a variety of air valves for sealing and inflating the air chamber. The most common air valves are Schrader, Presta, and Dunlop valves for interacting with a pump designed to fill the chamber to a desired air pressure. The variety of valves in the market has created a need for universal pumpheads usable with any valve with minimal inconvenience to a user. Previous pumpheads have used clamp jaws, tapered jaws, and tapered housings to clamp to and retain the air valve during inflation. Other pumpheads have utilized interchangeable parts or separate ports for connecting to the different valve types. However, these previous efforts resulted in large, bulky pumpheads, inconvenient user experiences, complex assemblies, and high costs.

There are several types of pumpheads that exist in the bicycle pump market space. All of those pumpheads have some way of securing the pumphead to the tire valve. Some thread onto the valve, some have quick release adapter via a button but the majority of them have a lever which the user pivots in order to lock the pumphead onto the valve. Typically, there are three types of these levers. Some are located the rear of the pumphead, some on top of the pumphead and some at the side.

Typically, two hands are needed to lock the prior pumpheads. One hand is used to place the pumphead body on the valve and hold it steady while the other hand is required to flip the lever to lock. This can be cumbersome if one is trying to hold the bike upright at the same time. It may also be challenging to pivot the lever because in some instances the wheel diameter or spoke does not allow for clearance to actually flip the lever up. For instance on children's bicycles the wheel diameter may be only 12 inches, which makes it difficult for a pumphead with a lever at the rear to lock due to its hitting the axle at the center of the wheel. In addition, some levers are hard to manipulate to the locked position because it requires the user to hold the pumphead steady or there simply isn't enough leverage working with them.

Bicycle tires have been manufactured for many years with two different types of air valves, the Schrader valve and the Presta valve. Therefore, it has been necessary for manufacturers to create two different valve heads, each of which can each mate with one of the two different valves. Some manufacturers have created a single valve head that is formed as a T, wherein one side of the T possesses a Schrader valve head and the other side of the T possesses a Presta valve head.

There have also been efforts to create a single valve head that is adaptable for mating with both Schrader and Presta valves. Such valve heads have included internal components that must be manipulated or changed, such that the valve head is engageable with a Schrader valve in one component configuration and is likewise engageable with a Presta valve in a second component configuration. While this type of single valve head has certain advantages over the prior art valve heads, the requirement that the user must alter the configuration of components within the valve head to change it from Schrader valve compatibility to Presta valve compatability has still created some difficulty and inconvenience. There is therefore a need for a single valve head that is compatible with both Schrader and Presta valve configurations, which valve head does not require any adjustments or internal valve component changes.

It is desirable to provide a pumphead with improved locking features.

SUMMARY

The present disclosure generally provides for a lightweight, compact, universal pumphead for forming airtight connections with air valves. Aspects of the pumphead provide a user the ability to secure and form a connection with an air valve without extensive setup or alterations to the pump or pumphead. The system and method allow a user to quickly connect and disconnect the pumphead to an air valve. While the present disclosure is discussed in regards to Schrader and Presta air valves, it will be understood by one skilled in the art that the present disclosure will function with other types of air valves known in the art.

The pumphead provides herein allows for single handed operation with better leverage for easier locking. The trigger operation provides a familiar feel because it is analogous to a pistol trigger. Simple one-handed unlocking is accomplished by flicking the trigger lever back to original position. The pumphead reduces the chance of lever interference when using it on small-diameter wheels such as a child's bike or wheels with limited clearance between the tire and the wheel. It also eliminates the occurrence of a lock level springing back and hitting the user's fingers, which can occur with conventional rear lever pumpheads. The pumphead design is adaptable to numerous air pumps, including floor pumps, frame pumps, mini-pumps or powered pumps such as electrical powered personal pumps or commercial pumps such as at service stations, repair shops, etc.

According to one aspect, the present disclosure provides a pumphead configured to secure an air valve.

The pumphead comprises a pumphead housing having a first end defining an aperture about a first axis, the aperture sized and shaped to receive a valve head therein; a handle housing defining an air passage in fluid connection with the aperture and an air pump about a second axis configured at an angle to the first axis; a lock arm comprising a first lock arm end pivotally coupled to the pumphead housing at a second end of the pumphead housing opposite the aperture; and a second lock arm end disposed proximate to the handle housing and proximate to the first end of the pumphead housing, wherein pivoting the lock arm away from the handle housing to a first position unlocks the pumphead housing from the valve head; and pivoting the lock arm toward the handle housing to a second position locks the pumphead housing around a valve head when the valve head is received in the aperture.

Embodiments of the pumphead include the following, alone or in any combination.

The lock arm comprises an opening between the first lock arm end and the second lock arm end configured around the handle housing.

In embodiments, the pumphead comprises an interior mechanism adapted to releasably secure a Schrader-type air valve or a Presta-type air valve to the pumphead. Preferably, the mechanism is adapted to releasably secure interchangeably a Schrader-type air valve and a Presta-type air valve to the pumphead without the need to manipulate or change the configuration of internal components of the mechanism.

A second aspect provides a pump comprising the pumphead described above, including any of the embodiments thereof.

The above summary has outlined some features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details.

The foregoing and other aspects, features, and advantages will be apparent to those artisans of ordinary skill in the art from the DETAILED DESCRIPTION and DRAWINGS, and from the CLAIMS.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 3A, 3B, 3C and 3D depict views of other embodiments of a pumphead according to an aspect of the present disclosure.

DETAILED DESCRIPTION

The disclosed pumphead is configured to be applied onto a valve and locked with a single hand. The pumphead includes a housing including an aperture operatively sized to receive the air valve, a pivoting lock arm for securing the air valve and an interior unit for engaging the valve head and delivering air to the inflatable object. In addition, the pivoting lock arm or lever is oriented in a way that provides clearance for all types of wheel sizes since the lever is located in a position that swings away from the wheel/spokes, not into it like many others. The action of locking may be familiar to many since it is effected by a trigger lever analogous to a pistol trigger. Because the lever is located at the front to form a trigger-style lever, it also produce more leverage and makes it easier for the user to lock the pump onto the valve using just one finger. Unlocking the valve is equally as easy and just requires a flick of the finger to return the valve back into the unlocked position.

The pumphead comprises a housing having a first end defining an aperture configured to receive a valve head therein; a handle housing defining an air passage in fluid connection with the aperture and an air pump; and a lock arm comprising an end pivotally coupled to the pumphead housing at the end of the pumphead housing opposite the aperture; and a second end disposed between the handle housing and the first end of the pumphead housing. Pivoting the lock arm toward the handle housing locks the pumphead housing around the valve head when the valve head is received in the aperture.

Figure 1A:
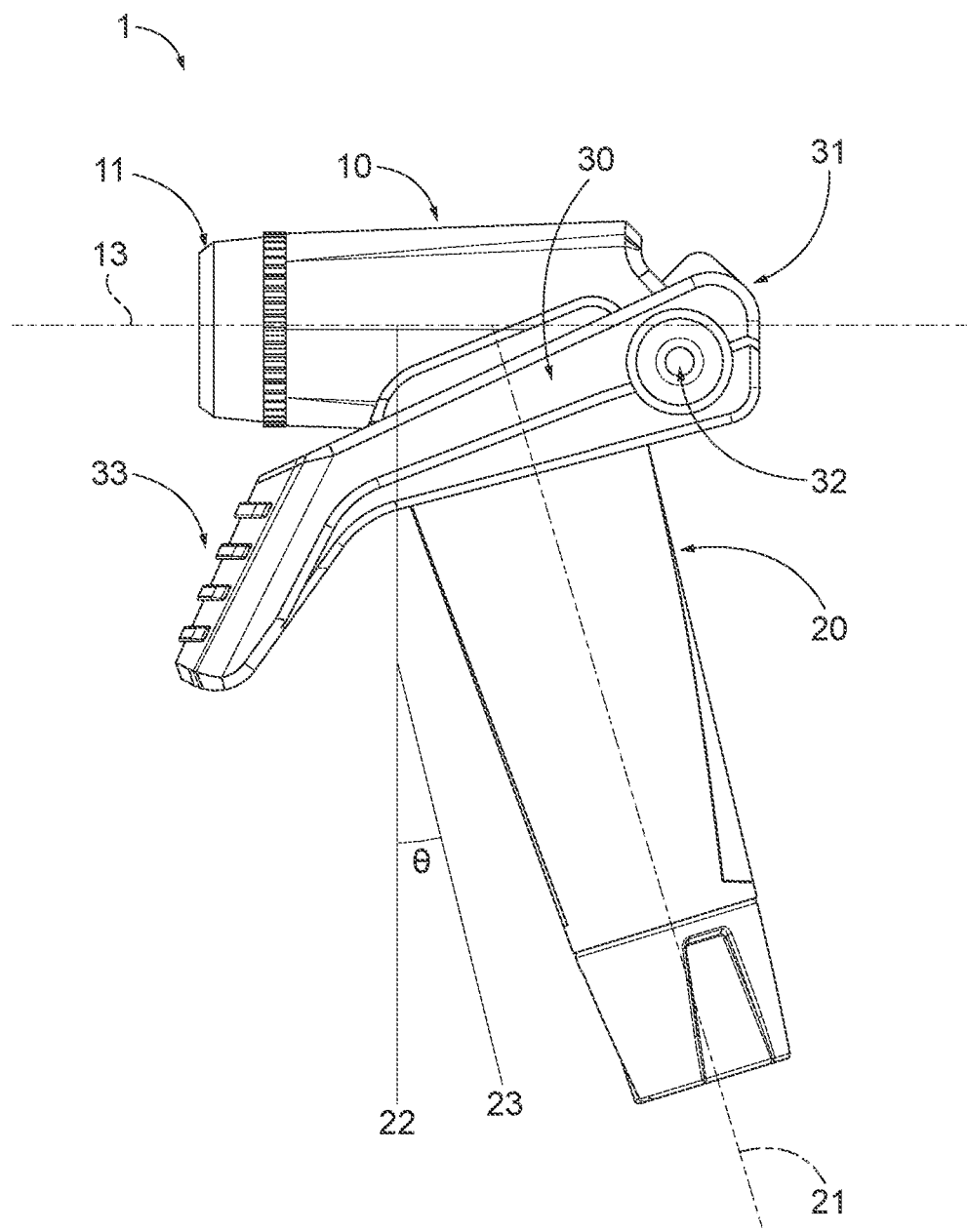
FIG. 1A depicts a side view of a pumphead according to an aspect of the present disclosure.

FIG. 1A depicts a side view of a pumphead 1 according to an exemplary embodiment of the disclosed subject matter. The pumphead 1 comprises a pumphead housing 10 having a first end 11 defining an aperture 12 (see FIG. 1B) about a first axis, dashed line 13, the aperture 12 sized and shaped to receive a valve head therein. The pumphead also comprises a handle housing 20 defining an internal air passage in fluid connection with the aperture 12 and an air pump (not shown) about a second axis dashed line 21 configured at an angle to the first axis 13. In embodiments, the angle between the first axis and the second axis may be 90 degrees as shown by line 22. Preferably, the angle between the first axis and the second axis is configured to provide an ergonomically suitable grip angle for a user to hold the pumphead and engage the pumphead to a valve head of an inflatable object such as a tire. The grip angle may be defined according to the angle θ between "vertical" line 22 orthogonal to the first axis and a second line 23 parallel to the second axis. For example, the grip angle θ may be from 10 to 35°, 15 to 30°, or 20 to 25°, or any angle between. Advantageously, the angled handle may also facilitate aligning the aperture in the pumphead with a valve head on a tire on a vehicle.

The pumphead 1 also comprises a lock arm 30 comprising a first lock arm end 31 pivotally coupled to the pumphead housing at a second end 14 of the pumphead housing opposite the aperture at pivot hub(s) 32; and a second lock arm end 33 disposed proximate to the handle housing 20 and proximate to the first end of the pumphead housing 11.

Figure 1B:
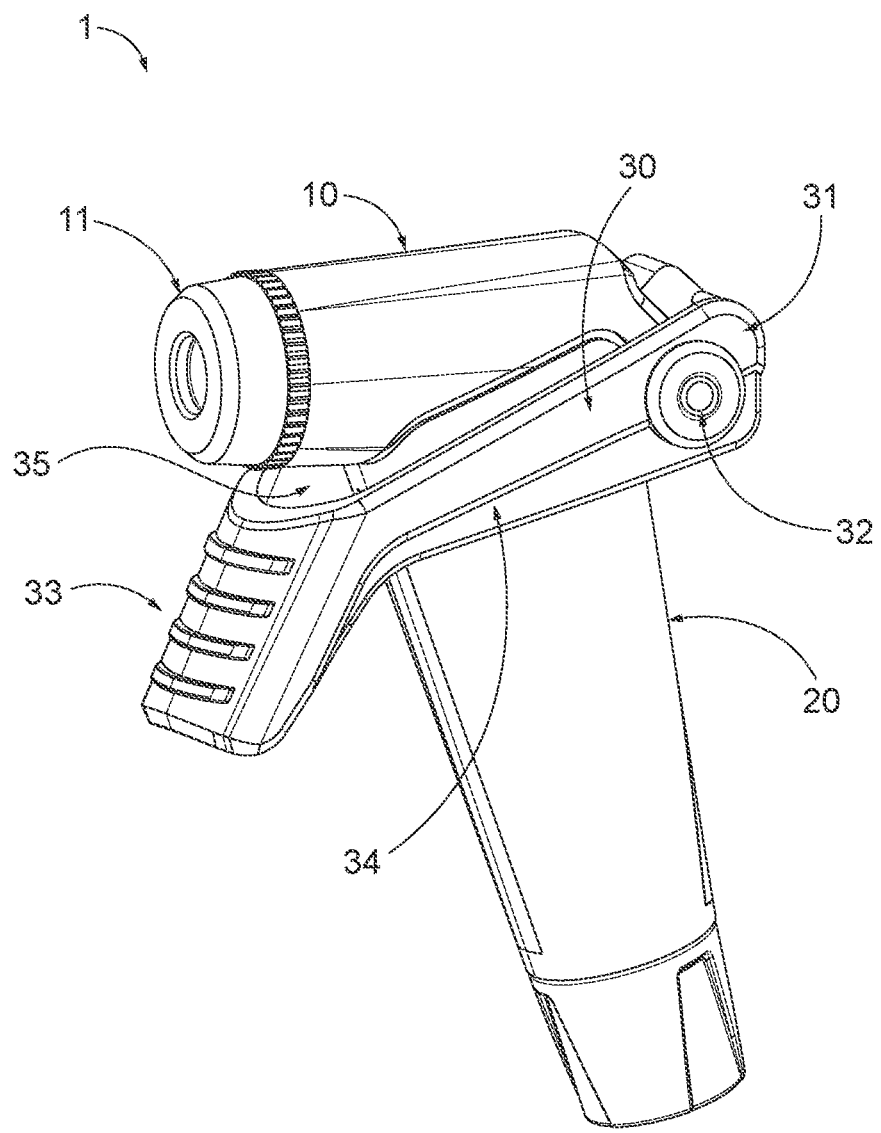
FIG. 1B depicts a side perspective view of a pumphead according to an aspect of the present disclosure.
Figure 1C:
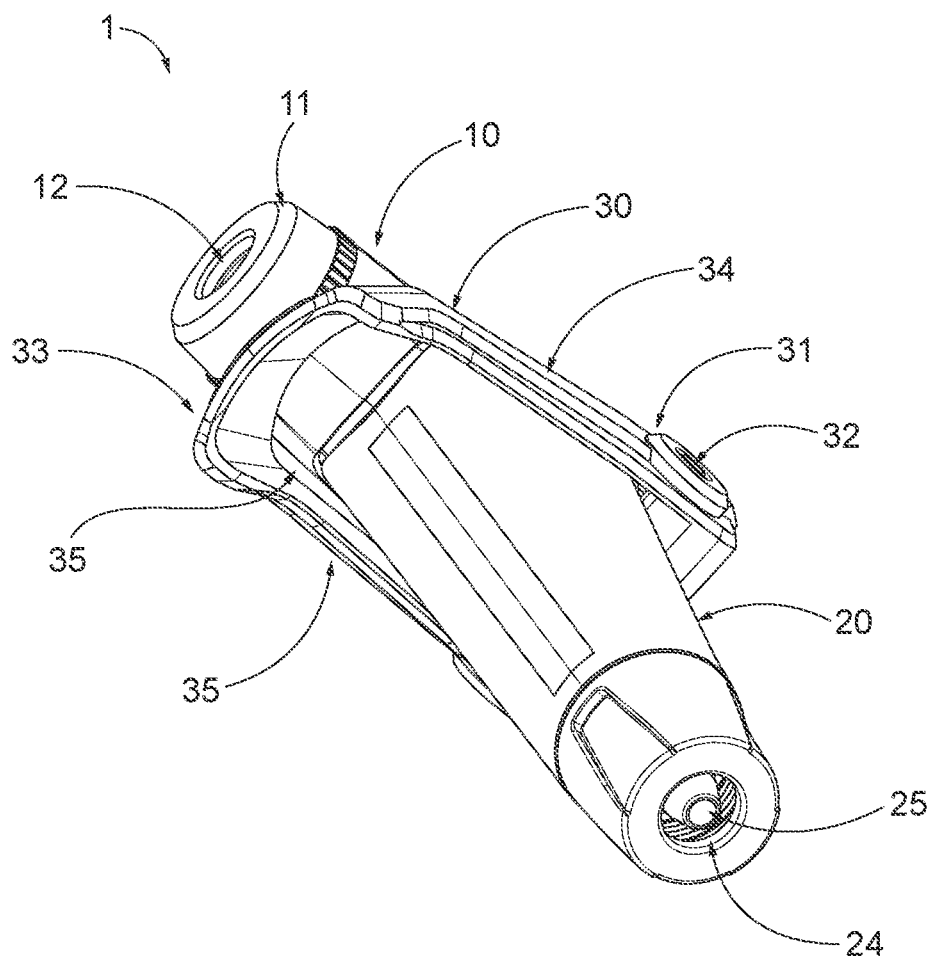
FIG. 1C depicts a bottom perspective view of a pumphead according to an aspect of the present disclosure.

FIG. 1B shows a side perspective view of pumphead 1 and FIG. 1C shows a bottom perspective view of pumphead 1. Aperture 12 can be seen in these views. Also visible in these views, the lock arm 30 comprises a first side 34 and a second side 35 with an opening 36 therebetween. Opening 36 is configured to allow the handle housing 20 to pass through. As shown in these figures, the trigger lever or lock arm 30 wraps around both sides of the pumphead, surrounding it for the most strength. In other embodiments, the trigger or lock arm may be configured to be attached to a single pivot hub so it reaches around only one side of the handle housing.

FIG. 1C also shows an opening 24 with a fitting 25 configured to engage a hose that conveys air from a pump to the pumphead. In the embodiment shown, the air hose may connect to a floor pump, hand pump, foot pump or powered pump. In other embodiments, the handle housing 20 may be integrated into a housing of a frame pump or mini-pump, in which the opening 24 is directly coupled to the pump mechanism without an intermediate hose. In all of these embodiments, pressurized air from the pump mechanism is conveyed through an air passage in the handle housing to the pumphead attached to a valve head and ultimately to the interior of an inflatable object comprising the valve head.

Figure 1D:
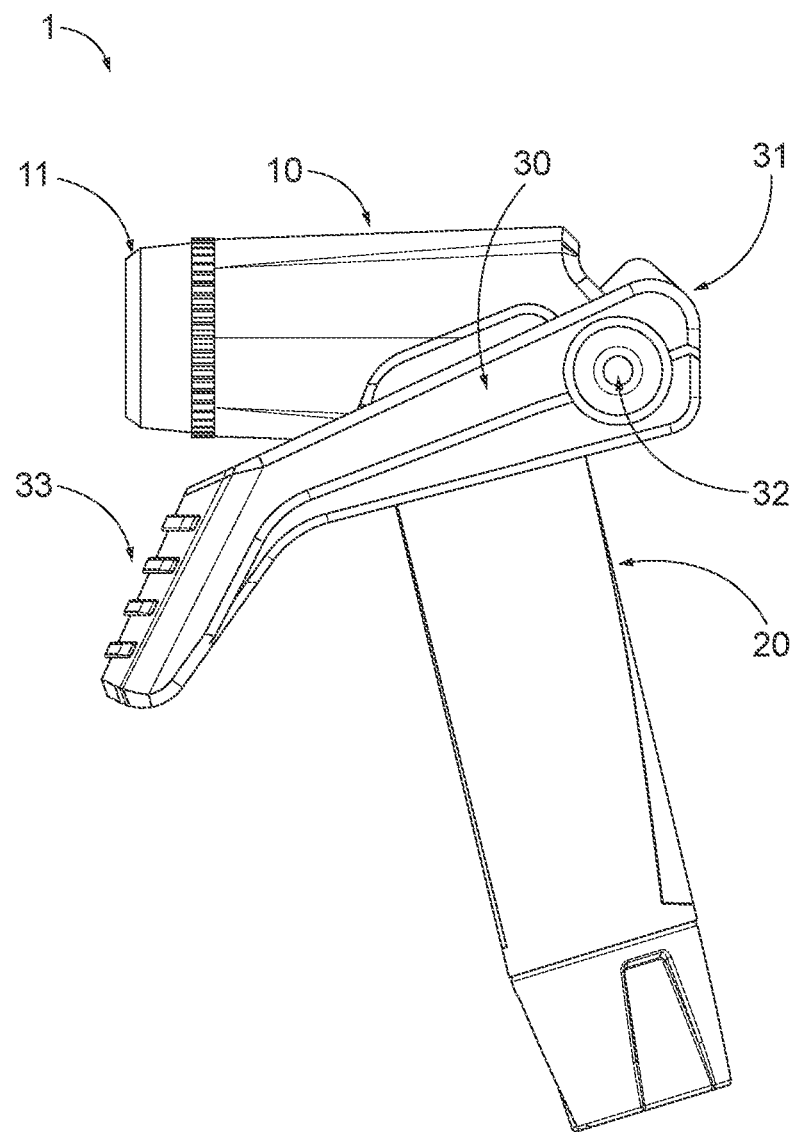
FIGS. 1D-1F depicts other embodiments of a pumphead according to an aspect of the present disclosure.
Figure 1E:
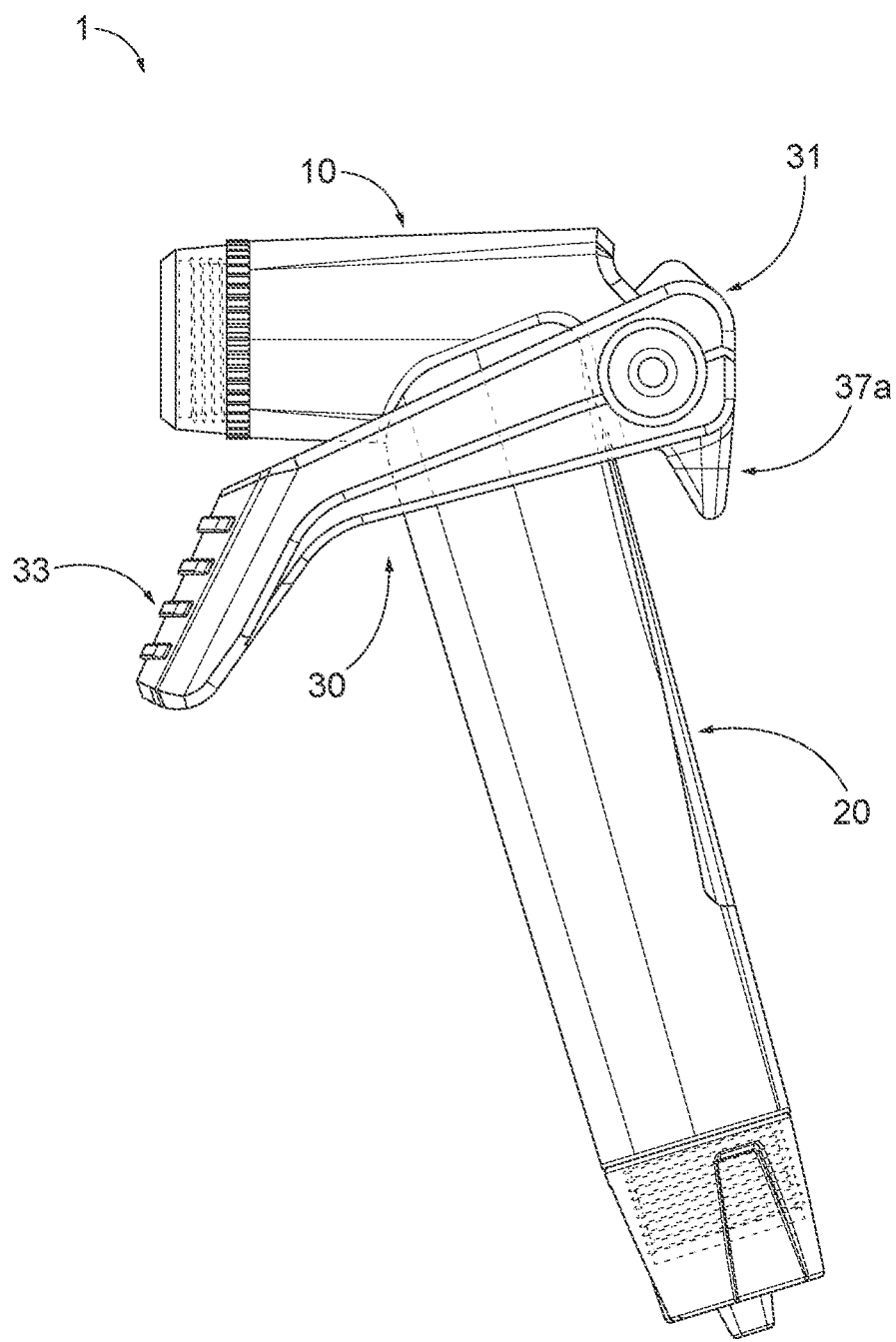
Figure 1F:
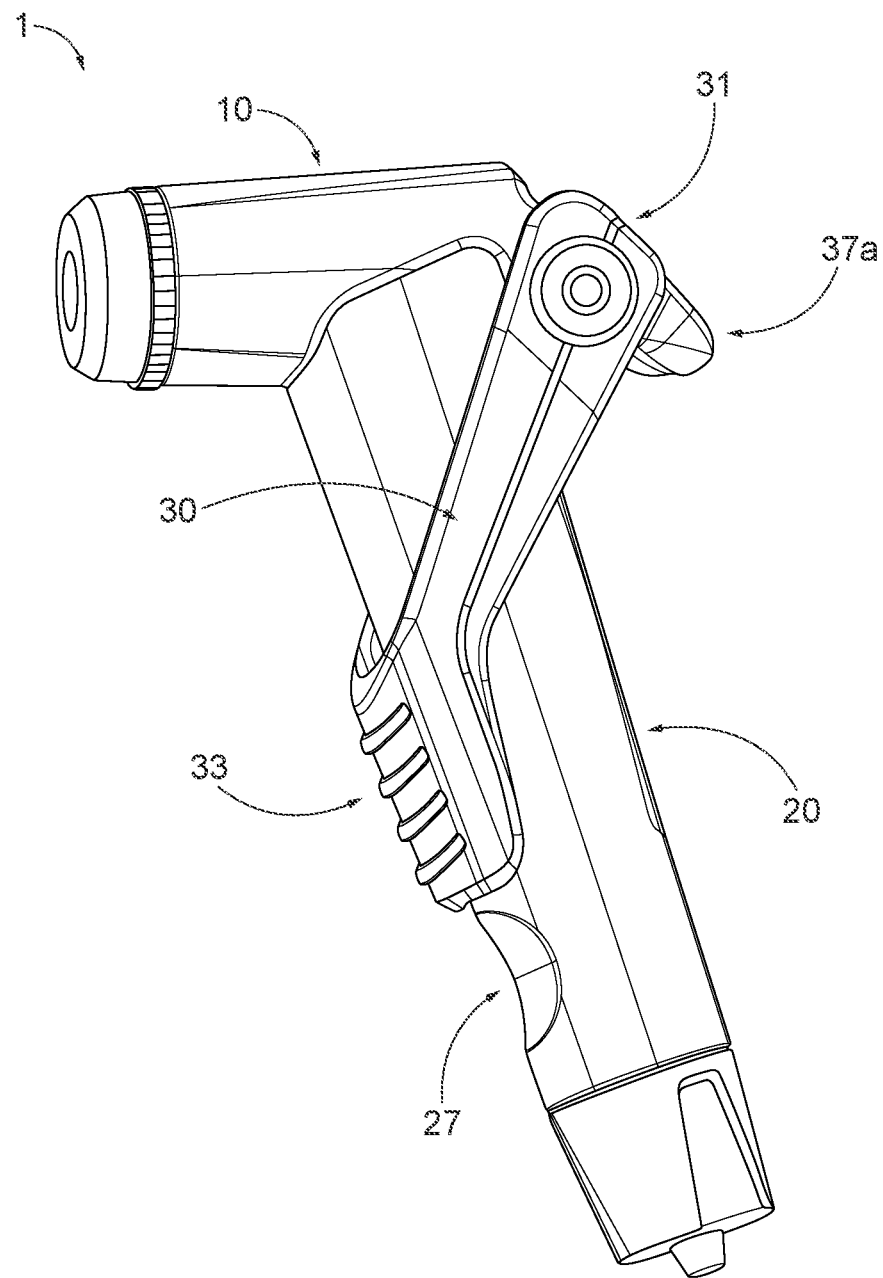

The handle housing 20 is not limited to any particular shape or size as long as it is configured to be gripped by a user to operate the trigger. FIG. 1D shows another embodiment of a pumphead 1 having a handle housing 20 with a smaller cross section compared to the handle housing illustrated in FIGS. 1A-1C. FIGS. 1E and 1F shows other embodiments of a pumphead with a handle housing 20 with a longer length. The side view shown in FIG. 1E shows the lock arm 30 in the unlocked position. The embodiment shown in FIG. 1F also has at least one indent 27 on the lower part of the handle housing 20 to help a user identify finger placement when operating the lock arm. This view also shows the lock arm 30 in the locked position. Both views show a tab 37a on the first end 31 of lock arm 30 to facilitate unlocking the lock arm as discussed below.

Figure 2B:
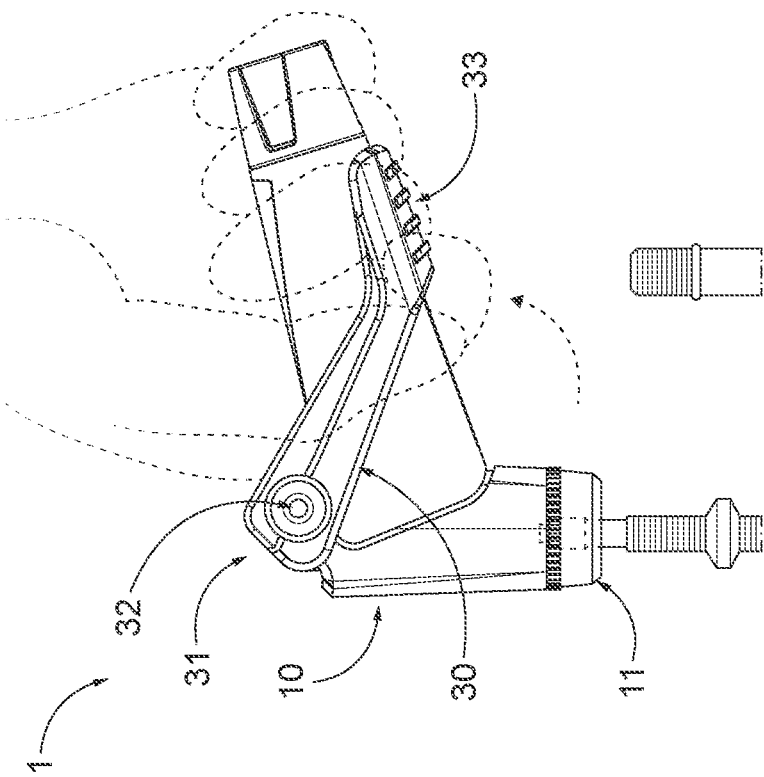
FIGS. 2A and 2B depict how a user would operate the pumphead to lock it onto a valve head according to an aspect of the present disclosure.
Figure 2A:
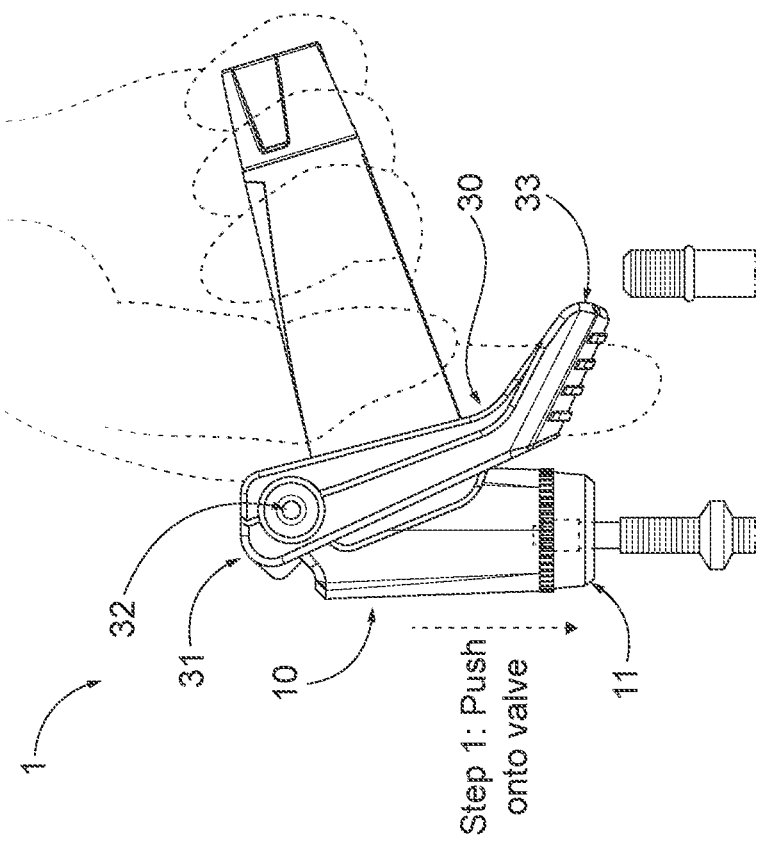

FIGS. 2A and 2B show depictions of how a user would operate the pumphead to attach the pumphead to a valve head, such as a Presta head or a Shrader head. As shown in FIG. 2A, the pumphead aperture is inserted over a valve stem head when the locking arm or lever 30 is in the unlocked (or first position) wherein the second lock arm end 32 is proximate to the front end of the pumphead housing. After the valve head is received in the aperture, pivoting the lock arm 30 toward the handle housing, indicated by the dashed arrow, to a second position wherein the second lock arm end 33 is proximate to the handle housing locks the pumphead housing around a valve head as shown in FIG. 2B. Pivoting the lock arm 30 away from the handle housing back to the first position unlocks the pumphead housing from the valve head. For unlocking the lock arm 30, a user may push the lock arm 30 forward to the first position by pushing on a first side of the lock arm with his thumb and/or the second side of the lock arm with his index finger.

FIGS. 3A and 3B show partial side and top views of an embodiment with a tab 37 disposed on the first lock arm end 31 wherein the lock arm 30 is in the unlocked position. Pivoting the lock arm in the direction shown by the dashed arrow will lock the pumphead housing around the valve head. Pulling the second end toward the handle housing with the user's finger(s), while pushing the tab 37 with a user's thumb may help pivot the lock arm. FIG. 3C shows a partial side view of this exemplary embodiment with the lock arm 30 in the locked position. Pulling back the tab 37 as indicated by the dashed arrow can unlock the pumphead from a valve head. In embodiments, the lock lever 30 may comprise projections 38 on the sides of the second lock arm end 33 to provide more grip surface to facilitate moving the lock arm 30 between lock and unlock positions.

Figure 3D:
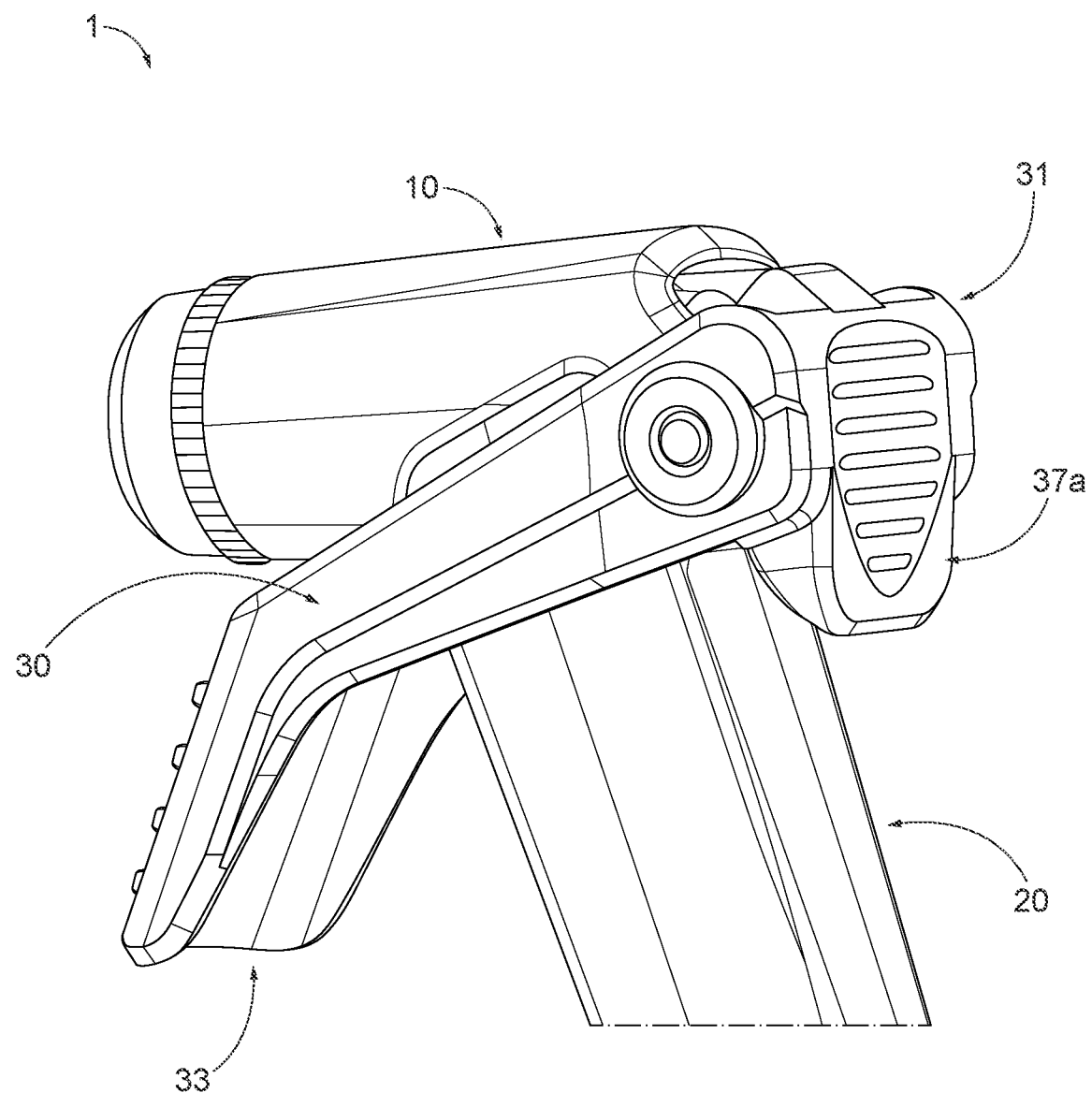

FIG. 3D shows a partial rear perspective view of the embodiments shown in FIGS. 1E and 1F with a tab 37a disposed on the first end 31 of lock arm 30 wherein the lock arm 30 is in the unlocked position. In contrast to the tab 37 oriented upward relative to the pumphead housing 10, tab 37a is oriented downward. As seen in FIG. 3D and in FIG. 1E, when the lock arm is in the unlocked position, tab 37a is disposed close to the handle housing 20. FIG. 3D also shows a grip surface on tab 37a as a visual and tactile indicator for the user to naturally place their thumb there when pushing the pumphead onto the valve. Pulling the trigger end 33 toward the handle housing will pivot the lock arm 30 to the position shown in FIG. 1F and lock the pumphead housing around a valve head. As shown in FIG. 1F, the tab 37a is disposed away from the handle housing 20. To unlock the pumphead from the valve head, a user's thumb can engage the tab 37a and push it toward the handle housing 20.

In embodiments, the pumphead may comprise a spring biased to urge the lever toward the unlocked first position. In these embodiments, a user may squeeze the trigger from the first unlocked position to the second locking position, thereby compressing the spring. The lock arm may engage a detent to hold the lock arm in the locked position around a valve head while a user inflates an object. When the user is ready to unlock the pumphead from the valve head, a slight squeeze of the trigger lock arm may disengage the lock arm from the detent, allowing the spring to decompress and urge the lock arm to the unlocked position.

According to another aspect, the pumphead also include an interior unit or mechanism to engage a valve head for inflating an object. The pumphead includes a housing and an interior unit configured to releasably engage a Shrader-type valve and/or a Presta-type valve. The housing includes an aperture operatively sized to receive an air valve. Preferably, the interior unit is configured to selectively engage a Shrader-type valve and/or a Presta-type valve without the need to manipulate or change any of the components of the interior unit.

Figure 4:
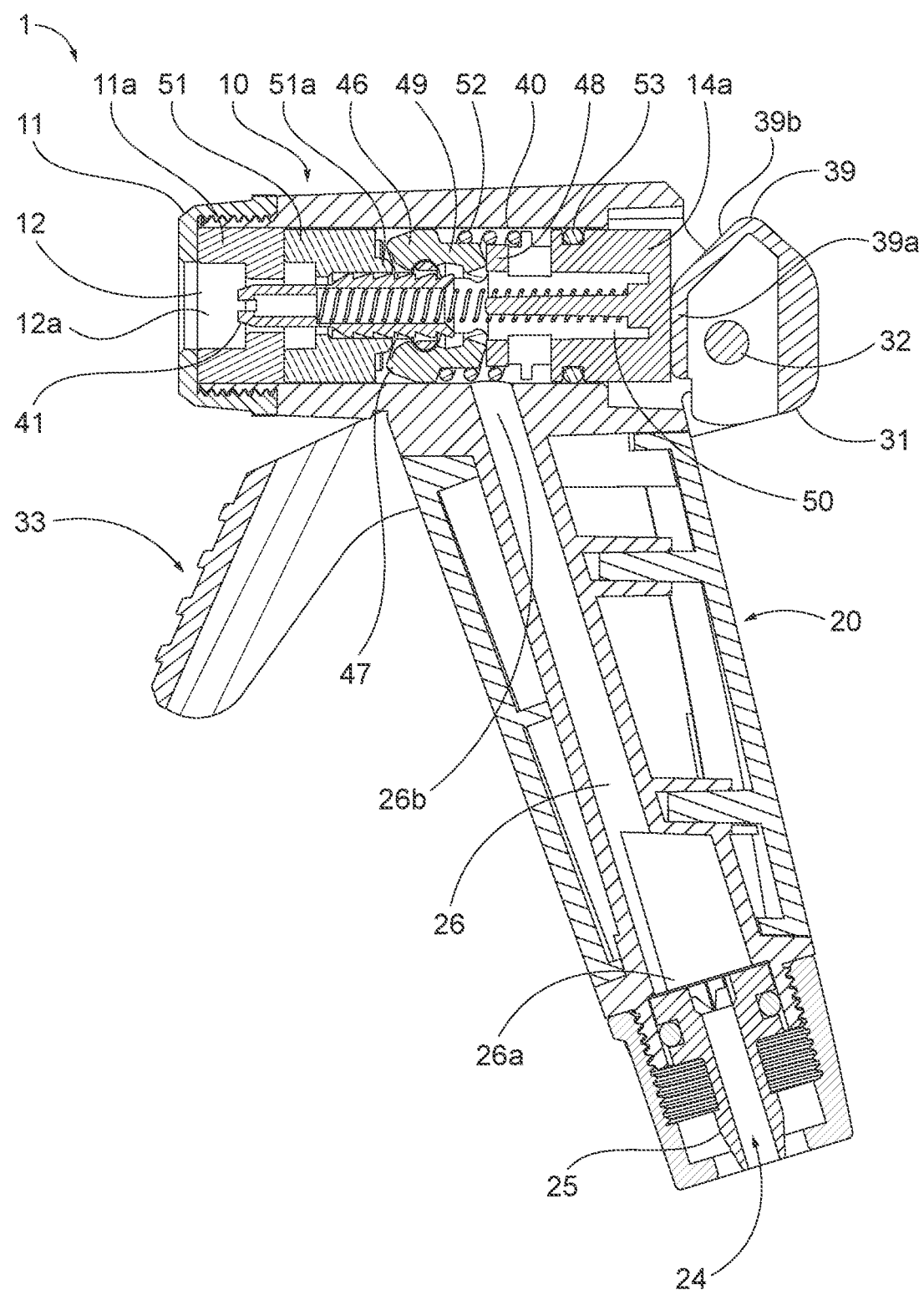
FIG. 4 depicts a side cross section view of a pumphead according to an aspect of the present disclosure.

FIG. 4 depicts a side cross section view of a pumphead 1 according to an exemplary embodiment of one aspect of the present disclosure. This mechanism operates according to descriptions in TW M251030, incorporated by reference herein in its entirety. As shown in FIG. 4, the pumphead 1 may include a housing 10 and an interior unit 40 located within the housing 10. The pumphead also comprises a handle housing 20 defining an air passage 26 connecting the pumphead 1 to a pump mechanism (not shown) to convey pressurized air to the pumphead. In the illustrated embodiment, a first end 26a of the air passage 26 is in fluid communication with aperture 24, which includes fitting 25 to engage a hose (not shown) in fluid communication with the pump mechanism. The second end 26b of the air passage 26 is in fluid communication with an air passage 50 in the interior mechanism 40. The first end 31 of the lock arm 30 comprises a projection 39 and surfaces 39a and 39b that are configured to engage the end of the interior mechanism 40 and advance component(s) toward the aperture 12 to lock them onto a valve head inserted therein when the lock arm is moved to the locking position shown in FIGS. 8A and 8B. In the unlocked position shown in FIG. 4, surface 39a is in contact with the back of interior mechanism 40.

Figure 5A:
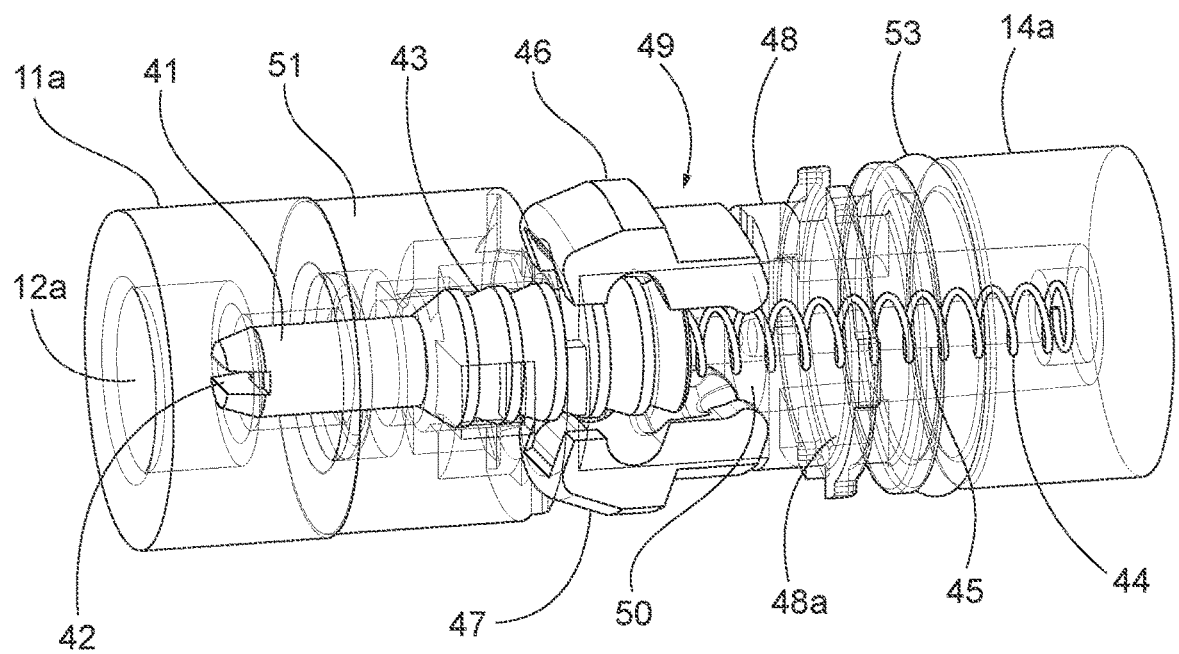
FIG. 5A depicts a perspective view of an interior unit of a pumphead according to an aspect of the present disclosure.
Figure 5B:
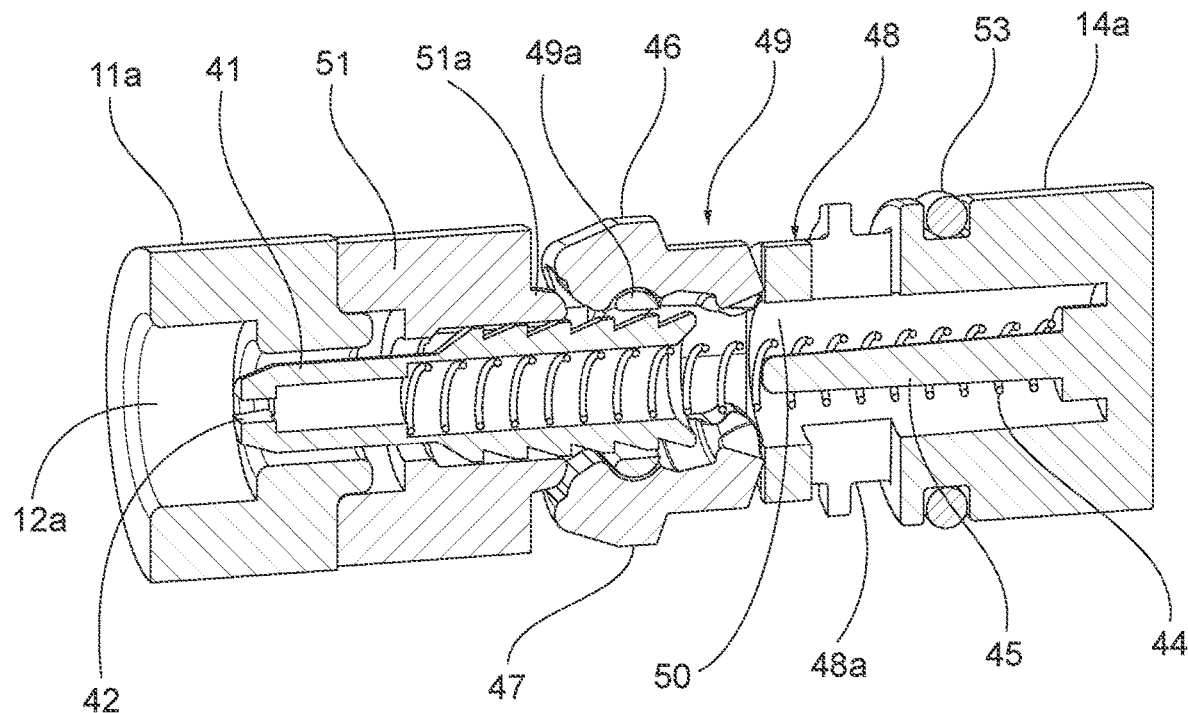
FIG. 5B depicts a cross-section view of an interior unit of a pumphead according to an aspect of the present disclosure.

As shown in perspective and cross section views in FIGS. 5A and 5B, the interior mechanism 40 includes a first end fitting 11a configured to be in contact with first end 11 of the housing 10 and second end 14a configured to be in contact with second end 14 of the housing 10 to anchor the interior unit 40 in the pumphead and align an interior aperture 12a with aperture 12 of the pumphead. The interior unit 40 may include a movable pin 41 defining a pin notch 42 on an exterior of the movable pin 41. Movable pin 41 also comprises a plurality of ridges 43 circumferentially disposed around it. The movable pin 41 may be coupled to a pin return spring 44 that is biased along the axis 13 (see FIG. 1A) to return the movable pin 41 to a pin rest position when the pumphead 1 is not in use. A guide pin 45 may be coupled to the pin return spring 44. Jaws 46 and 47 on clamp 49 are configured to engage the plurality of ridges 43 to clamp movable pin 41 in position as described below. Clamp 49 comprises a pivot 49a that pivots jaws 46 and 47 outward or inward when the mechanism is in the unlocked or locked configurations. Fitting 48 is disposed between jaws 46 and 47 and the second end 14a of the interior mechanism to translate movement from the second end 14a to the jaws 46,47. Fitting 48 has recesses 48a configured to be in fluid connection with end 26b of air passage 26 to allow air to pass into an internal air passage 50 inside the internal unit 40 and out the aperture 12a. Grommet or O-ring 53 is configured to seal the back end of the internal unit 40 inside the pumphead housing 10. Collar 51 is disposed around the pin 41 and comprises a rear flange 51a configured to engage jaws 46 and 47. A helical spring 52 is disposed around the jaws 46, 47 and fitting 48 (see FIG. 4).

Figure 6:
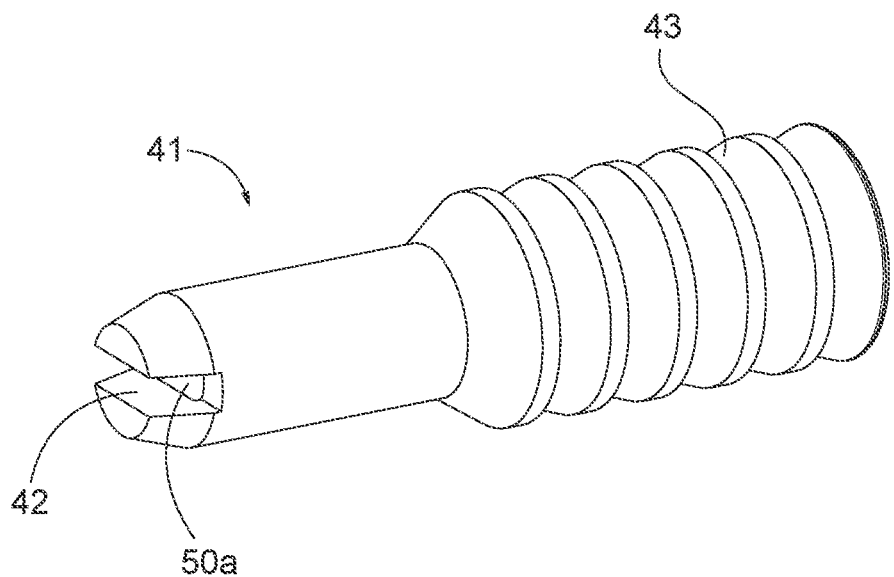
FIG. 6 depicts a perspective view of an interior pin of a pumphead according to an aspect of the present disclosure.

FIG. 6 shows a perspective view of the pin 41 in which the air passage 50 passes through the interior of pin 41 to exit 50a disposed in the pin notch 42.

Figure 7A:
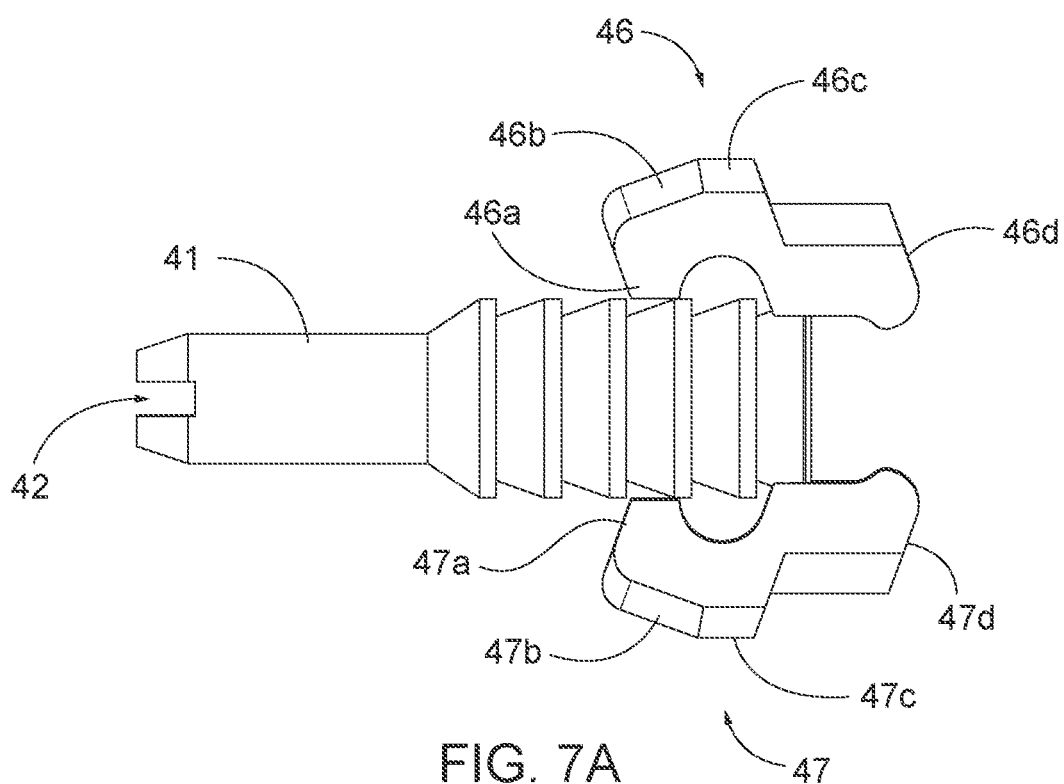
FIGS. 7A-7C depict views of an interior pin engaged to an interior clamp of a pumphead according to an aspect of the present disclosure.

FIG. 7A shows a side view of pin 41 engaged to jaws 46 and 47. Jaws 46, 47 comprise first ends 46a, 47a configured to engage the plurality of ridges 43 on pin 41. Surfaces 46b, 47b are configured to engage the inner surface of the pumphead housing 10 when the internal mechanism 40 is in the locked position. Surfaces 46c, 47c are configured to engage the inner surface of the pumphead housing 10 when the internal mechanism 40 is in the unlocked position. Second ends 46d, 47d are configured to engage a forward end of the fitting 48 to translate movement from the second end 14a to the jaws 46,47 when the trigger is operated between locked and unlocked positions. Pushing the rear 14a forward by moving the trigger to the locked position (see FIGS. 8A and 8B) will cause the clamp jaws to close against the ridges 43 on the center pin 41 and lock it into position as shown in FIG. 7C.

Figure 7B:
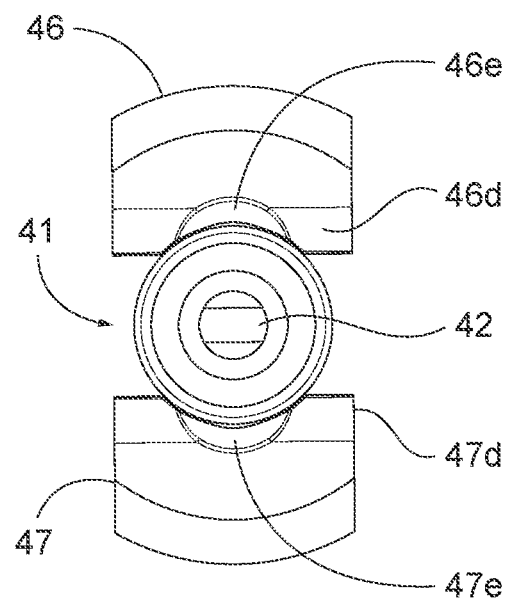
Figure 7C:
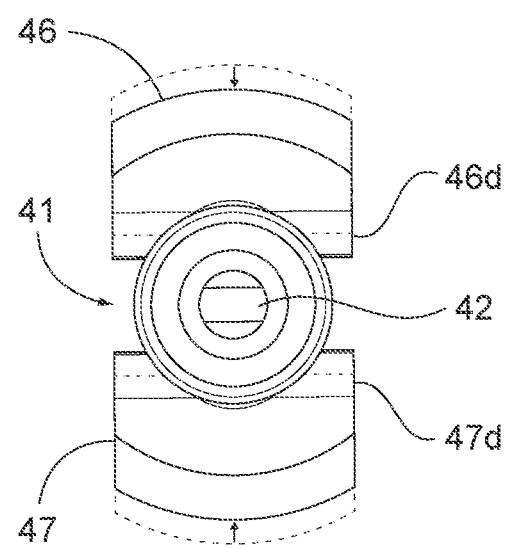

FIG. 7B shows an end view of the pin 41 and jaws 46 and 47 in an unlocked configuration. Ends 46d and 47d have arcuate cut-outs 46e and 47e having a radius corresponding to the radius of the pin 41 between and/or behind the ridges 43 on pin 41. FIG. 7C shows an end view of the pin 41 and jaws 46 and 47 in a locked configuration. Jaws 46 and 47 are pivoted inward on pivot 49a so the cut-outs 46e and 47e of jaw ends 46d and 47d are engaged to the pin 41 behind the ridges 43.

Figure 8A:
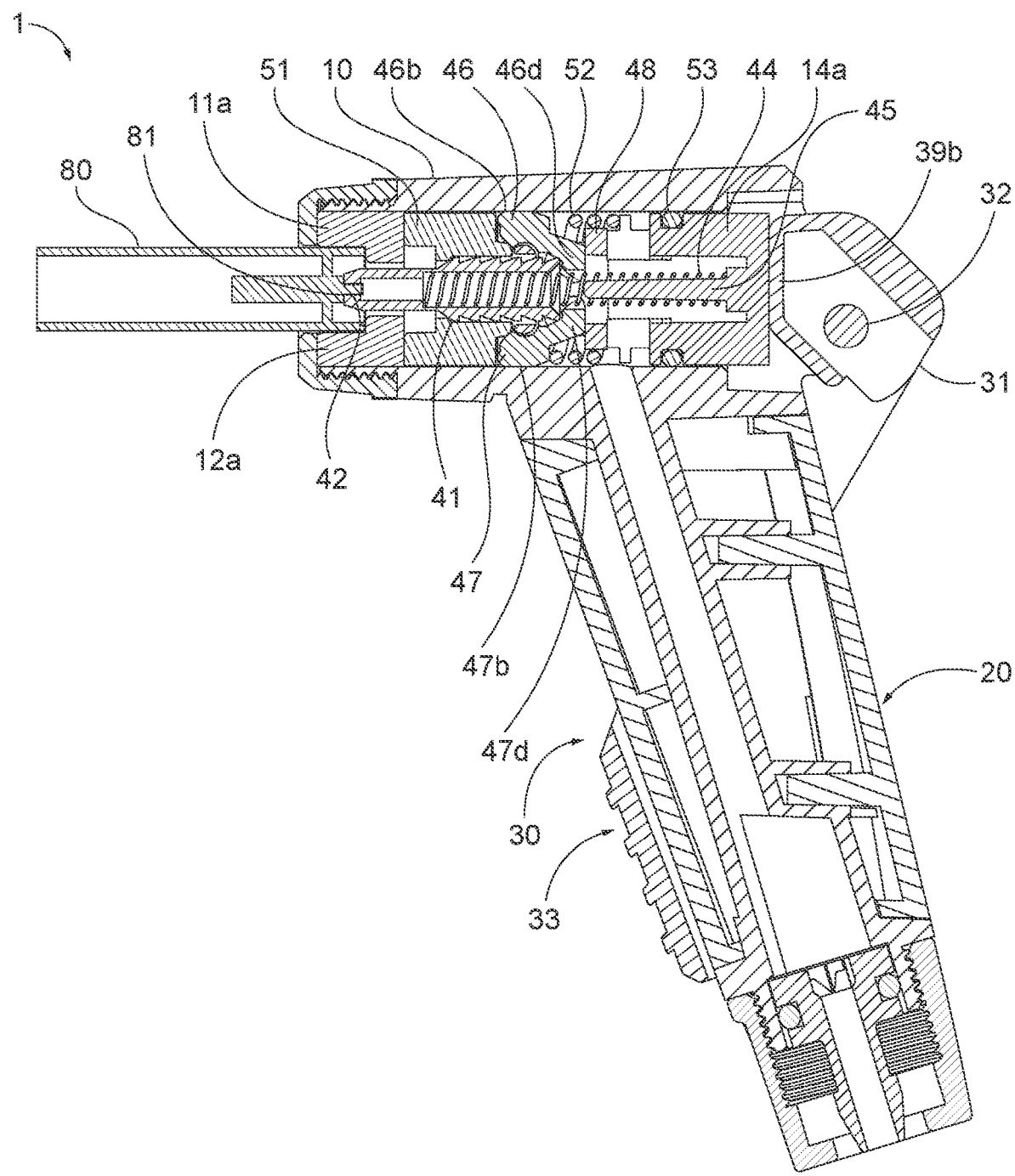
FIGS. 8A-8B depict cross-section views of a pumphead engaged to different valve heads according to aspects of the present disclosure.
Figure 8B:
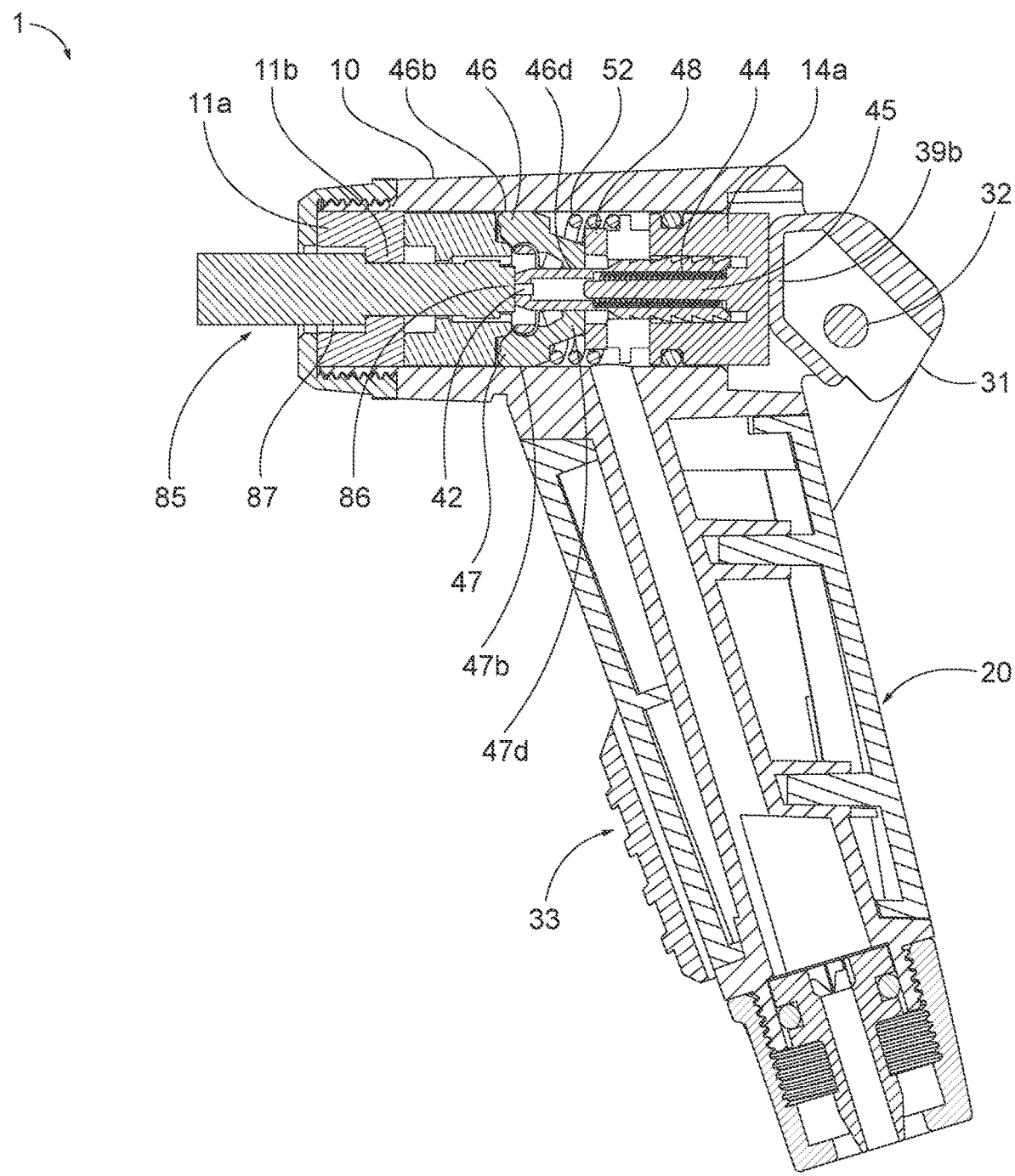

FIG. 8A shows a cross section of the pumphead 1 when it is locked onto a Schrader valve 80 for inflating a tire. Shrader valve 80 is inserted into aperture 12a so that its internal pin 81 is engaged with notch 42 at the end of pin 41. Trigger 30 is moved to a locking position wherein second end 33 is adjacent to handle housing 20. First end 31 has rotated around pivot 32 disposing surface 39b into the rear of end 14a, moving it forward. This in turn moves fitting 48 forward into ends 46d, 47d of jaws 46 and 47, moving them forward so that they interact with flange 51a of collar 51. Jaws 46 and 47 are pivoted about pivot 49a so that their ends 46d and 47d are engaged to the center pin 41. Surfaces 46b and 47b engage the inner surface of housing 10 to help hold the clamp 49 in its forward position. Spring 52 is compressed so that its decompression facilitates backward motion of the clamp 49 when the trigger is moved back into the unlocked position.

8A shows a cross section of the pumphead 1 when it is locked onto a Presta valve 85 for inflating a tire. Presta valve 85 is inserted into aperture 12a so that its end 86 is engaged with notch 42 at the end of pin 41. The Presta valve 85 is inserted into the opening 12a until shoulder 87 engages flange 11b on first end fitting 11a. End 86 pushes center pin 41 backward toward guide pin 45, compressing spring 44. Spring 44 is compressed so that its decompression facilitates forward motion of the pin 41 when the trigger is moved back into the unlocked position. Trigger 30 is moved to a locking position wherein second end 33 is adjacent to handle housing 20. First end 31 has rotated around pivot 32 disposing surface 39b into the rear of end 14a, moving it forward. This in turn moves fitting 48 forward into ends 46d, 47d of jaws 46 and 47, moving them forward so that they interact with flange 51a of collar 51. Jaws 46 and 47 are pivoted about pivot 49a so that their ends 46d and 47d are engaged to the center pin 41. Surfaces 46b and 47b engage the inner surface of housing 10 to help hold the clamp 49 in its forward position. Spring 52 is compressed so that its decompression facilitates backward motion of the clamp 49 when the trigger is moved back into the unlocked position.

Another exemplary interior unit is described in U.S. Pat. No. 6,076,544, incorporated herein by reference. The housing may have generally cylindrical sidewalls and a base wall. A collet is disposed within the housing. The collet has generally cylindrical sidewalls and a plurality of upwardly extending collet fingers. A generally cylindrical gasket member is disposed within the collet. The gasket is composed of a resilient material and has a valve insertion bore formed centrally therethrough. The lever arm is operably engaged to the collet and functions to pull the collet downwardly into the housing. The downward movement of the collet causes the collet fingers to move inwardly, thereby creating an inwardly directed force upon the resilient gasket such that the diameter of the gasket bore is reduced. When a Schrader valve is disposed within the gasket bore, the downward movement of the collet causes the Schrader valve to move downwardly in frictional engagement with the gasket, and the downward motion of the Schrader valve upon a stationary actuator member projecting from the base of the housing opens the Schrader valve. A Presta valve disposed within the gasket bore is not drawn downwardly, thus avoiding damage to the Presta valve.

Another exemplary interior unit is described in U.S. Pat. No. 11,235,738, incorporated herein by reference. The interior unit is located within the housing and may include a movable pin operatively configured to press against and open the air valve while the lock arm is engaged. The movable pin may be held against the air valve by a compressed elastic taper C-ring when the lock arm is engaged. A pin notch disposed on an exterior of the movable pin may be configured to receive the elastic taper C-ring when the lock arm is engaged. The elastic taper C-ring may operate by securing the movable pin or the air valve. The lock arm may be disengaged to release the air valve.

Another exemplary internal mechanism is described in U.S. Pat. No. 9,206,916, incorporated herein by reference. The mechanism comprises a housing, a plunger mounted in a plunger chamber in the housing, multiple steel balls mounted around a periphery of the plunger, a push post and a compression spring mounted inside the plunger. It also includes multiple plunger springs mounted between the plunger and the housing and a pressing lever mounted on a top of the housing to abut against a top end of the plunger, and a sealing collar mounted on a bottom of the plunger chamber. The mechanism can lock around a Schrader or Presta valve by moving the plunger forward. The steel balls can be driven by the motion of the plunger against a taper step that moves the steel balls inward to engage the back end of the push post to lock it against a Schrader valve. When a Presta valve is inserted into the mechanism, it is inserted to a deeper depth than a Schrader valve and the push post is driven backward. Moving the pressing lever into the locking position moves an end of the plunger to abut a conic head on a rear portion of a sealing collar moving it inward to clamp around the shank of the Presta valve.

Another exemplary interior unit comprises a rear fitting comprising clamp jaws mounted on flexible posts. The housing has an internal taper step configured to move the clamp jaws inward when the locking lever is moved to its lock position. The clamp jaws lock around a center pin to hold it in position when a Schrader of Presta calve is inserted into the mechanism.

One skilled in the art will appreciate that the same embodiment of the pumphead may be used for multiple types of air valves, such as those described above. The pumphead allows a user to form an airtight connection simply by engaging a lock arm without a need to consider the type of air valve being connected. As a result, a smaller, more lightweight pumphead has been described in this disclosure.

Also provided is a pump comprising the pumphead disclosed herein.

Most human-powered pumps used to inflate bicycle tires are reciprocating pumps. They have a piston inside an outer cylinder attached by a connecting rod to a handle for reciprocating the piston within the outer cylinder and two one-way valves: one at the outlet of the pump going to the bicycle tire and one at the inlet for outside air to enter the pump. When the pump handle is pulled out, the volume of the space defined by the piston and the outer cylinder increases and air pressure inside decreases. This draws in air from the outside through the inlet valve and closes the valve at the outlet to the bike tire. When the piston is pushed in again, it compresses the air inside. This closes the inlet valve and opens the outlet valve to the tire, pushing air into the tire.

Reciprocating pumps may take several forms. A common form is a floor pump in which the outer cylinder/piston assembly is oriented vertically and supported on a floor stand. The floor stand typically comprises a footpad for the user to stand on to hold the pump steady during pumping. The pump also comprises a T-handle to allow the user to grip the handle with two hands and move the piston reciprocally in the outer cylinder. Commonly, the outlet of the pump is located near the bottom of the floor pump and is configure to be in fluid communication with a hose that extends from the outlet of the pump to the pumphead engaged to the inlet valve of the inflatable object.

A foot pump comprises an outer cylinder/piston assembly disposed generally horizontally and the piston is reciprocated within the cylinder by a foot treadle rather than a handle. Typically, a foot pump may have a shorter, wider-diameter outer cylinder than a floor pump. A hose in fluid communication with the pumphead connects the pump body to the inflatable object via the pumphead.

A mini-pump is a small reciprocating pump configured so that a user holds the outer cylinder with one hand, usually near the outlet end of the mini-pump and moves the piston in and out of the pump with the other hand.

A frame pump is a portable pump that is designed to fit within a bicycle frame and become a part of the bike's front triangle until it is needed. It is similar in operation to the mini-pump but may have larger pumping capacity.

Mini-pumps and frame pumps may comprise a hose in fluid communication with the pumphead described herein. Alternatively and/or preferably, a mini-pump or a frame pump may comprise an outer cylinder integrated with the handle housing 20 of the pumphead in a linear orientation, in which the opening 24 is directly coupled to the pump mechanism without an intermediate hose.

In other embodiments, the pump may be an electrically powered pump.

Although embodiments have been described in detail for purposes of illustration, various modifications may be made without departing from the scope and spirit of the present disclosure. Accordingly, the disclosure is not to be limited by the examples presented herein, but is envisioned as encompassing the scope described in the appended claims and the full range of equivalents of the appended claims. The detailed description and drawings are merely illustrative of the present disclosure rather than limiting, the scope of the present disclosure being defined by the appended claims and equivalents thereof.

Benefits, other advantages, and solutions to problems have been described herein with regard to specific embodiments. However, the benefits, advantages, solutions to problems, and elements that may cause any benefit, advantage, or solution to occur or become more pronounced are not to be construed as critical, required, or essential features or elements of the disclosure.

It should be understood that when an element is referred to as being "connected" or "coupled" to another element (or variations thereof), it can be directly connected or coupled to the other element or intervening elements may be present.

Further, it should be appreciated that in the appended claims, reference to an element in the singular is not intended to mean "one and only one" unless explicitly so stated, but rather "one or more."

The description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The words "illustrative" or "exemplary" are used herein to mean "serving as an example, instance, or illustration."

Any aspect described herein as "illustrative" or "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The invention claimed is:

1. A pumphead comprising:
   a pumphead housing having a first end defining an aperture about a first axis, the aperture sized and shaped to receive a valve head therein;
   a handle housing defining an air passage in fluid connection with the aperture and an air pump about a second axis configured at an angle to the first axis that is not orthogonal to the first axis;
   a lock arm comprising
      a first lock arm end pivotally coupled to the pumphead housing at a second end of the pumphead housing opposite the aperture; and
      a second lock arm end disposed proximate to the handle housing and proximate to the first end of the pumphead housing, wherein
      pivoting the lock arm away from the handle housing to a first position unlocks the pumphead housing from the valve head; and
      pivoting the lock arm toward the handle housing to a second position locks the pumphead housing around a valve head when the valve head is received in the aperture.

2. The pumphead of claim 1 wherein the lock arm comprises an opening between the first lock arm end and the second lock arm end configured around the handle housing.

3. The pumphead of claim 1 comprising an internal mechanism configured to lock onto different valve heads.

4. The pumphead of claim 1, wherein the valve head is a Schrader-type air valve or a Presta-type air valve.

5. A pump comprising a pumphead comprising
   a pumphead housing having a first end defining an aperture about a first axis, the aperture sized and shaped to receive a valve head therein;
   a handle housing defining an air passage in fluid connection with the aperture and an air pump about a second axis configured at an angle to the first axis that is not orthogonal to the first axis;
   a lock arm comprising
      a first lock arm end pivotally coupled to the pumphead housing at a second end of the pumphead housing opposite the aperture; and
      a second lock arm end disposed proximate to the handle housing and proximate to the first end of the pumphead housing, wherein
      pivoting the lock arm away from the handle housing to a first position unlocks the pumphead housing from the valve head; and
      pivoting the lock arm toward the handle housing to a second position locks the pumphead housing around a valve head when the valve head is received in the aperture.

6. The pump of claim 5, wherein the valve head is a Schrader-type air valve or a Presta-type air valve.

7. The pump of claim 5 comprising a reciprocating pump in fluid communication with the pumphead.

8. The pump of claim 5 comprising a floor pump, hand pump, foot pump frame pump, mini-pump or electrically powered pump.

9. The pump of claim 5 comprising a hose in fluid communication with the pumphead and a pump mechanism in the pump.

10. The pump of claim 5 wherein the handle housing is integrated into an outer cylinder of the pump.

11. The pumphead of claim 1 wherein the angle between the first axis and the second axis provides a grip angle from 10 to 35 degrees.

12. The pump of claim 5 wherein the angle between the first axis and the second axis provides a grip angle from 10 to 35 degrees.

13. A pumphead comprising:
   a pumphead housing having a first end defining an aperture about a first axis, the aperture sized and shaped to receive a valve head therein;
   a handle housing defining an air passage in fluid connection with the aperture and an air pump about a second axis configured at an angle to the first axis;
   a lock arm comprising
      a first lock arm end pivotally coupled to the pumphead housing at a second end of the pumphead housing opposite the aperture; and
      a second lock arm end disposed proximate to the handle housing and proximate to the first end of the pumphead housing, wherein the lock arm comprises an opening between the first lock arm end and the second lock arm end configured around the handle housing,
   wherein
      pivoting the lock arm away from the handle housing to a first position unlocks the pumphead housing from the valve head; and
      pivoting the lock arm toward the handle housing to a second position locks the pumphead housing around a valve head when the valve head is received in the aperture.

14. The pumphead of claim 11 wherein the handle housing about the second axis is configured at an angle to the first axis to provide a grip angle from 10 to 35°.

15. The pumphead of claim 11 comprising an internal mechanism configured to lock onto different valve heads.

16. The pumphead of claim 11, wherein the valve head is a Schrader-type air valve or a Presta-type air valve.

17. The pumphead of claim 11 comprising a reciprocating pump in fluid communication with the pumphead.

18. The pumphead of claim 15, wherein the valve head is a Schrader-type air valve or a Presta-type air valve.

19. The pumphead of claim 15 comprising a floor pump, hand pump, foot pump frame pump, mini-pump or electrically powered pump.

20. The pumphead of claim 15 comprising a hose in fluid communication with the pumphead and a pump mechanism in the pump.

21. The pumphead of claim 15 wherein the handle housing is integrated into an outer cylinder of the pump.

22. A pump comprising a pumphead comprising
   a pumphead housing having a first end defining an aperture about a first axis, the aperture sized and shaped to receive a valve head therein;

a handle housing integrated into an outer cylinder of the pump disposed about a second axis configured at an angle to the first axis and defining an air passage in fluid connection with the aperture;

a lock arm comprising
- a first lock arm end pivotally coupled to the pumphead housing at a second end of the pumphead housing opposite the aperture; and
- a second lock arm end disposed proximate to the handle housing and proximate to the first end of the pumphead housing, wherein pivoting the lock arm away from the handle housing to a first position unlocks the pumphead housing from the valve head; and pivoting the lock arm toward the handle housing to a second position locks the pumphead housing around a valve head when the valve head is received in the aperture.

* * * * *